US012219121B2

(12) United States Patent
Sun et al.

(10) Patent No.: US 12,219,121 B2
(45) Date of Patent: Feb. 4, 2025

(54) IMAGING DEVICE FOR ACQUIRING THREE-DIMENSIONAL INFORMATION OF WORKPIECE SURFACE AND TWO-DIMENSIONAL IMAGE OF WORKPIECE (71) Applicant: FANUC CORPORATION, Yamanashi (JP)

(72) Inventors: Zeyuan Sun, Yamanashi (JP); Kentaro Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 141 days.

(21) Appl. No.: 18/000,933

(22) PCT Filed: Jun. 14, 2021

(86) PCT No.: PCT/JP2021/022570
§ 371 (c)(1),
(2) Date: Dec. 7, 2022

(87) PCT Pub. No.: WO2021/256437
PCT Pub. Date: Dec. 23, 2021

(65) Prior Publication Data
US 2023/0224450 A1 Jul. 13, 2023

(30) Foreign Application Priority Data
Jun. 18, 2020 (JP) .................... 2020-105456

(51) Int. Cl.
H04N 13/286 (2018.01)
G06T 3/20 (2006.01)
(Continued)

(52) U.S. Cl.
CPC ............. *H04N 13/286* (2018.05); *G06T 3/20* (2013.01); *G06T 7/521* (2017.01); *G06T 7/593* (2017.01);
(Continued)

(58) Field of Classification Search
CPC .. H04N 13/286; H04N 13/254; H04N 13/239; G06T 7/521; G06T 7/593; G06T 3/20
See application file for complete search history.

(56) References Cited

U.S. PATENT DOCUMENTS

| 2013/0011018 A1* | 1/2013 | Tateno | ...................... G06T 7/75 901/14 |
| 2018/0315210 A1* | 11/2018 | Takizawa | .................. G06T 7/70 |
| 2022/0092330 A1* | 3/2022 | Amano | ..................... G06T 7/55 |

FOREIGN PATENT DOCUMENTS

| JP | 201336988 A | 2/2013 |
| JP | 2018185219 A | 11/2018 |

* cited by examiner

Primary Examiner — Rowina J Cattungal
(74) Attorney, Agent, or Firm — HAUPTMAN HAM, LLP (57) ABSTRACT Provided is an imaging device for acquiring three-dimensional information of a workpiece surface and a two-dimensional image. An imaging device comprises a visual sensor for acquiring a two-dimensional image after acquiring three-dimensional information of a workpiece surface. A position detection device is attached to the conveyor drive motor of a conveyor that conveys a workpiece. An image processing part calculates the amount of movement of the workpiece from when the three-dimensional information is acquired to when the two-dimensional image is captured on the basis of an output of the position detection device. The image processing part moves the three-dimensional information relative to the two-dimensional image in such a manner as
(Continued)

to correspond to the amount of movement of the workpiece in a predetermined coordinate system.

3 Claims, 8 Drawing Sheets

(51) Int. Cl.
  *G06T 7/521* (2017.01)
  *G06T 7/593* (2017.01)
  *H04N 13/239* (2018.01)
  *H04N 13/254* (2018.01)
(52) U.S. Cl.
  CPC ......... *H04N 13/239* (2018.05); *H04N 13/254* (2018.05); *G06T 2207/30164* (2013.01)

IMAGING DEVICE FOR ACQUIRING THREE-DIMENSIONAL INFORMATION OF WORKPIECE SURFACE AND TWO-DIMENSIONAL IMAGE OF WORKPIECE

RELATED APPLICATIONS

The present application is a National Phase of International Application No. PCT/JP2021/022570 filed Jun. 14, 2021, which claims priority to Japanese Application No. 2020-105456, filed Jun. 18, 2020.

TECHNICAL FIELD

The present invention relates to an imaging device for acquiring three-dimensional information of a surface of a workpiece and a two-dimensional image of the workpiece.

BACKGROUND ART

In the related art, there is known an apparatus for capturing an image with a vision sensor and detecting the shape of the surface of an object or the position of the object based on the obtained image. As a vision sensor, a two-dimensional sensor for capturing a two-dimensional image of a surface of a workpiece is known. Further, a three-dimensional sensor for measuring the distance from a vision sensor to the surface of a workpiece is known. The three-dimensional position of a specific part of a workpiece can be calculated based on the distance from a three-dimensional sensor to the surface of a workpiece and the position of the three-dimensional sensor.

A robot device including a robot and an operation tool is known in the related art. It is known that a vision sensor is arranged in the robot device in order to detect the position of a workpiece. For example, a robot device grasps a workpiece using a hand and conveys the workpiece. The robot device needs to detect the position and the orientation of a workpiece in order to grasp the workpiece. In the related art, there is known a control for calculating the position and the orientation of a workpiece by processing a two-dimensional image captured by a two-dimensional camera and a distance image captured by a three-dimensional sensor (e.g., Japanese Unexamined Patent Publication No. 2013-36988A).

CITATION LIST

Patent Literature

[PTL 1] Japanese Unexamined Patent Publication No. 2013-36988A

SUMMARY OF INVENTION

Technical Problem

In the image processing, three-dimensional information acquired by the three-dimensional sensor and a two-dimensional image acquired by the two-dimensional sensor are used in some cases. For example, in a robot device in which a robot grasps and conveys a workpiece conveyed by a conveyor, the workpiece conveyed by the conveyor is imaged by a three-dimensional sensor. A three-dimensional map of measurement points is acquired from the output of the three-dimensional sensor. The position and the orientation of the workpiece can be detected based on the three-dimensional map. Based on the position and the orientation of the workpiece, the position and the orientation of the robot when the robot takes out the workpiece can be calculated.

Here, it is necessary to specify the position of the workpiece in the three-dimensional map. A two-dimensional image can be used in order to specify the position of the workpiece. However, when the two-dimensional image is captured after the three-dimensional map is acquired by the three-dimensional sensor, the workpiece has been moved by the conveyor. A deviation occurs between the position of the workpiece when the three-dimensional map is acquired and the position of the workpiece when the two-dimensional image is captured. Thus, acquisition of three-dimensional information by the three-dimensional sensor and acquisition of a two-dimensional image by the two-dimensional sensor are preferably performed in a state where the workpiece is arranged at the same position. For example, preferably, imaging by the three-dimensional sensor and imaging by the two-dimensional sensor are simultaneously performed. By this control, the workpiece when the two-dimensional image is captured and the workpiece when the three-dimensional information is acquired are located at the same position, and the position of the workpiece in the three-dimensional information can be easily specified.

However, when the three-dimensional sensor is a stereo camera including two cameras and a projector, the projector projects the reference pattern onto the workpiece. When capturing the two-dimensional image and imaging for acquiring the three-dimensional map are simultaneously performed, the reference pattern appears on the two-dimensional image. Thus, there is a problem that it is difficult to detect a feature portion of the workpiece in the two-dimensional image. As described above, there has been a problem that it is difficult to simultaneously acquire the three-dimensional information and the two-dimensional image during the period when the workpiece is moving on the carrier machine.

The three-dimensional information can be acquired by the three-dimensional sensor and the two-dimensional image can be acquired by the two-dimensional sensor in a state where the carrier machine is stopped. In this control, there is a problem that the work efficiency is lowered because it is necessary to stop the carrier machine every time the three-dimensional information and the two-dimensional image are acquired by the vision sensors. Additionally, when the carrier machine is started or stopped, there is a possibility that the position of the workpiece on the carrier machine changes. That is, the position of the workpiece on the carrier machine may be shifted.

Alternatively, a sensor other than the stereo camera can be used as the three-dimensional sensor. For example, a Time of Flight (TOF) camera using the flight time of light can be used as the three-dimensional sensor. However, when a TOF camera is used, there is a problem that it is necessary to further arrange a camera for acquiring a two-dimensional image.

Solution to Problem

One aspect of the present disclosure is an imaging device for imaging a workpiece conveyed in a predetermined direction by a carrier machine driven by a motor. The imaging device includes a three-dimensional sensor for detecting three-dimensional information of the surface of a workpiece and a two-dimensional sensor for acquiring a two-dimensional image of the surface of the workpiece. The imaging device includes a processing unit for processing output of the three-dimensional sensor and output of the two-dimensional sensor. The processing unit includes a three-dimensional information generation unit for generating three-dimensional information based on the output of the three-dimensional sensor, and a two-dimensional image acquisition unit for acquiring a two-dimensional image from the two-dimensional sensor. The processing unit includes a movement control unit for changing the relative position of the three-dimensional information with respect to the two-dimensional image in a predetermined coordinate system. The carrier machine includes a position detector for detecting the position of the movement member moved by the motor. The timing for acquiring the three-dimensional information is different from the timing for acquiring the two-dimensional image. The movement control unit calculates the movement amount of the workpiece corresponding to the difference between the first position of the movement member when the three-dimensional information is acquired and the second position of the movement member when the two-dimensional image is acquired. The movement control unit performs control for moving the three-dimensional information in a manner to correspond to the movement amount of the workpiece in the coordinate system, and moving the three-dimensional information of the workpiece into the region of the two-dimensional image of the workpiece.

Advantageous Effects of Invention

In accordance with aspects of the present disclosure, an imaging device for acquiring three-dimensional information on the surface of the workpiece and a two-dimensional image of the workpiece can be provided.

DESCRIPTION OF EMBODIMENTS

Referring to FIGS. 1 to 10, an imaging device and a robot device including the imaging device according to embodiments will be described. The robot device according to the present embodiment includes a robot and an operation tool attached to the robot. Further, the robot device includes an imaging device for imaging a workpiece, and a carrier machine for conveying the workpiece.

Figure 1:
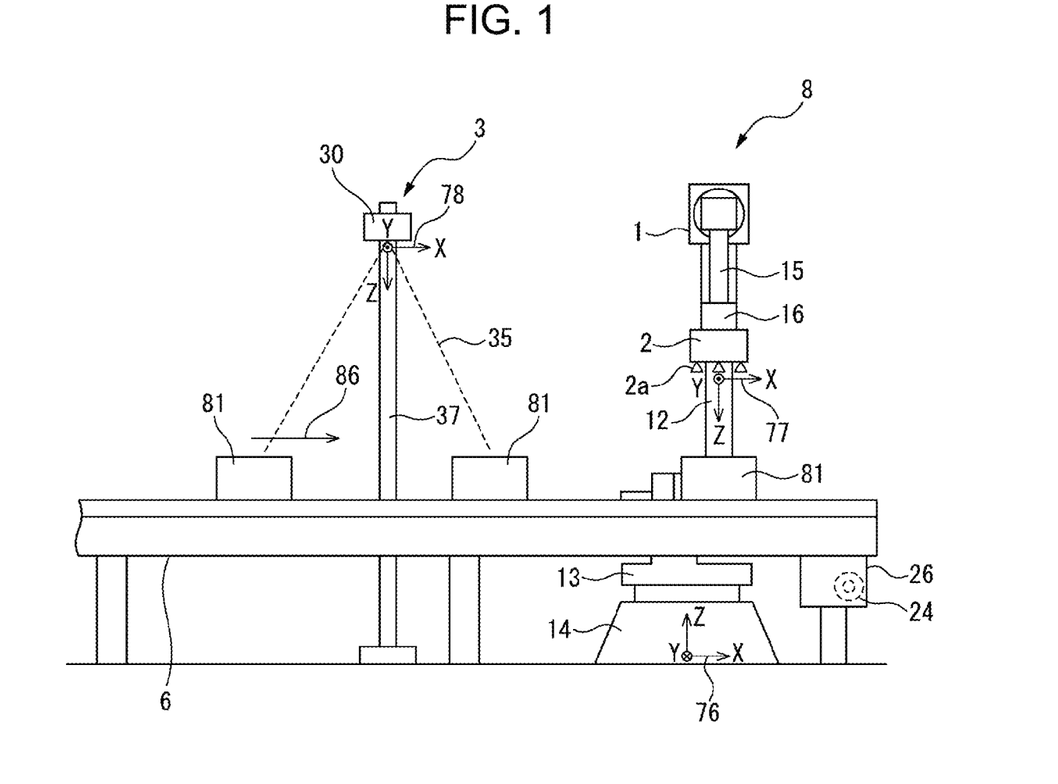
FIG. 1 is a front view of a first robot device according to an embodiment.
Figure 2:
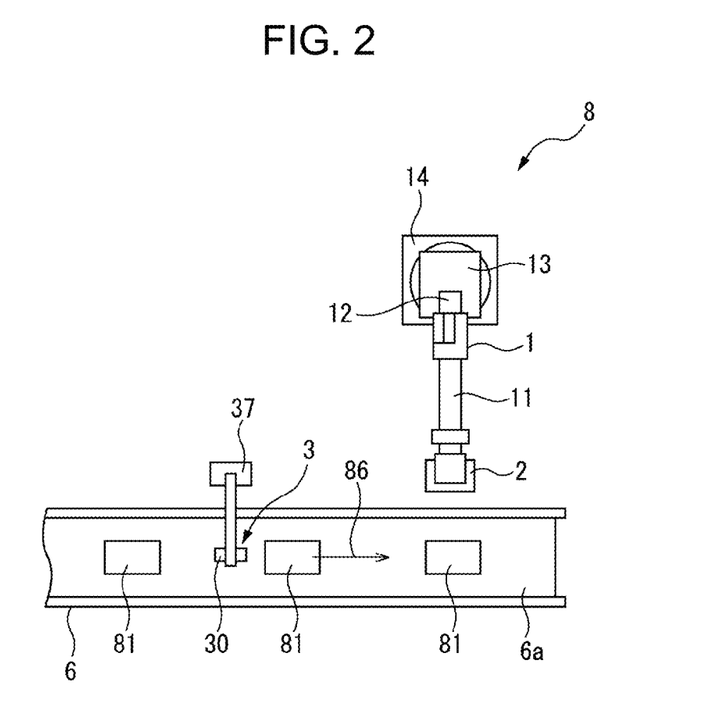
FIG. 2 is a plan view of a first robot device.

FIG. 1 is a schematic front view of a first robot device according to the present embodiment. FIG. 2 is a schematic plan view of the first robot device according to the present embodiment. Referring to FIGS. 1 and 2, a first robot device 8 includes a hand 2 as an operation tool (end effector) and a robot 1 for moving the hand 2. The robot 1 according to the present embodiment is an articulated robot including a plurality of joints.

The robot 1 includes a base 14 fixed to an installation surface, and a turning base 13 rotating with respect to the base 14. The robot 1 includes a lower arm 12 rotatably supported by a turning base 13 and an upper arm 11 rotatably supported by the lower arm 12. Further, the upper arm 11 rotates about a rotation axis parallel to the extending direction of the upper arm 11. The robot 1 includes a wrist 15 rotatably supported at the end of the upper arm 11. A flange 16 configured rotatably is disposed at the tip of the wrist 15. The robot 1 according to the present embodiment includes six drive axes, but is not limited to this configuration. Any robot that can move an operation tool can be employed.

A workpiece 81 according to the present embodiment is a rectangular parallelepiped box. Hand 2 is an operation tool for grasping and releasing the workpiece 81. The hand 2 according to the present embodiment includes a plurality of absorption pads 2a. The hand 2 grasps the workpiece 81 by suction. The hand 2 is fixed to the flange 16 of the wrist 15. The operation tool attached to the robot 1 is not limited to this configuration. Any operation tool can be employed depending on the task performed by the robot device. For example, in a robot device for arc welding, a welding torch can be arranged as a working tool. Alternatively, in a robot device that applies a sealant to the surface of the workpiece, a dispenser can be arranged as an operation tool.

The first robot device 8 includes a conveyor 6 as a carrier machine that conveys the workpiece 81 in a predetermined direction. The conveyor 6 according to the present embodiment rotates an annular belt 6a. The conveyor 6 moves the workpiece 81 horizontally, as indicated by an arrow 86. The conveyor 6 conveys the workpiece 81 to a position where the robot 1 change its position and orientation so that the hand 2 can grasp the workpiece 81. The robot device 8 grasps the workpiece 81 conveyed by the conveyor 6, and then moves the workpiece 81 to the target position. For example, the robot device 8 performs the task of stacking the workpiece 81 on the upper side of the pallet.

The robot device 8 includes an imaging device 3 for imaging the workpiece 81 conveyed by the conveyor 6. The imaging device 3 includes a vision sensor 30 as a three-dimensional sensor for detecting three-dimensional information on the surface of the workpiece 81. The position information of a three-dimensional measurement point (three-dimensional point) corresponding to the surface of the workpiece 81 as an object is generated by the output of the vision sensor 30. As will be described later, the vision sensor 30 according to the present embodiment also functions as a two-dimensional sensor for capturing a two-dimensional image of the surface of the workpiece 81.

The vision sensor 30 is supported by a support member 37. The position of the vision sensor 30 according to the present embodiment is fixed. The vision sensor 30 is disposed at a position where the vision sensor 30 can image the workpiece 81 conveyed by the conveyor 6. The vision sensor 30 is disposed upstream of the robot 1 in the direction where the workpiece 81 is conveyed.

In the present embodiment, the position and the orientation of the workpiece 81 are detected based on the three-dimensional information acquired from the output of the vision sensor 30. The position and the orientation of the robot 1 for grasping the workpiece 81 by the hand 2 are calculated based on the position and the orientation of the workpiece 81. By changing the position and the orientation of the robot 1, the workpiece 81 conveyed by the conveyor 6 can be grasped and moved by the hand 2.

In the present embodiment, the vision sensor 30 images the workpiece 81 without stopping the conveyor 6. That is, the vision sensor 30 images the workpiece 81 while the conveyor 6 moves the workpiece 81. Further, the robot 1 changes the position and the orientation so as to grasp the workpiece 81 by hand 2 while the conveyor 6 moves the workpiece 81. The workpiece 81 is picked up from the conveyor 6 by the robot 1 changing the position and the orientation.

The robot device 8 is set with the world coordinate system 76 as a reference coordinate system. In the example illustrated in FIG. 1, the origin of the world coordinate system 76 is located in the base 14 of the robot 1. Even when the position and the orientation of the robot 1 change, the position and the direction of the world coordinate system 76 do not change. The world coordinate system 76 includes an X-axis, a Y-axis, and a Z-axis orthogonal to each other as coordinate axes. Further, the W-axis is set as a coordinate axis around the X-axis. A P-axis is set as a coordinate axis around the Y-axis. An R-axis is set as a coordinate axis around the Z-axis.

Further, a tool coordinate system 77 including an origin set at an arbitrary position of the operation tool is set. In the present embodiment, the origin of the tool coordinate system 77 is set at the tool tip point of hand 2. As the position and the orientation of the robot 1 change, the position and the orientation of the tool coordinate system 77 change. For example, the position of the robot 1 corresponds to the position of the tool tip point. Further, the orientation of the robot 1 corresponds to the direction of tool coordinate system 77 with respect to the world coordinate system 76.

Further, in the robot device 8, a sensor coordinate system 78 is set corresponding to the vision sensor 30. The sensor coordinate system 78 is a coordinate system whose origin is fixed to the vision sensor 30. The sensor coordinate system 78 according to the present embodiment has a fixed position. Thus, the coordinate values in the sensor coordinate system 78 can be converted to the coordinate values in the world coordinate system 76 based on the position and the orientation of the sensor coordinate system 78 with respect to the world coordinate system 76.

Figure 3:
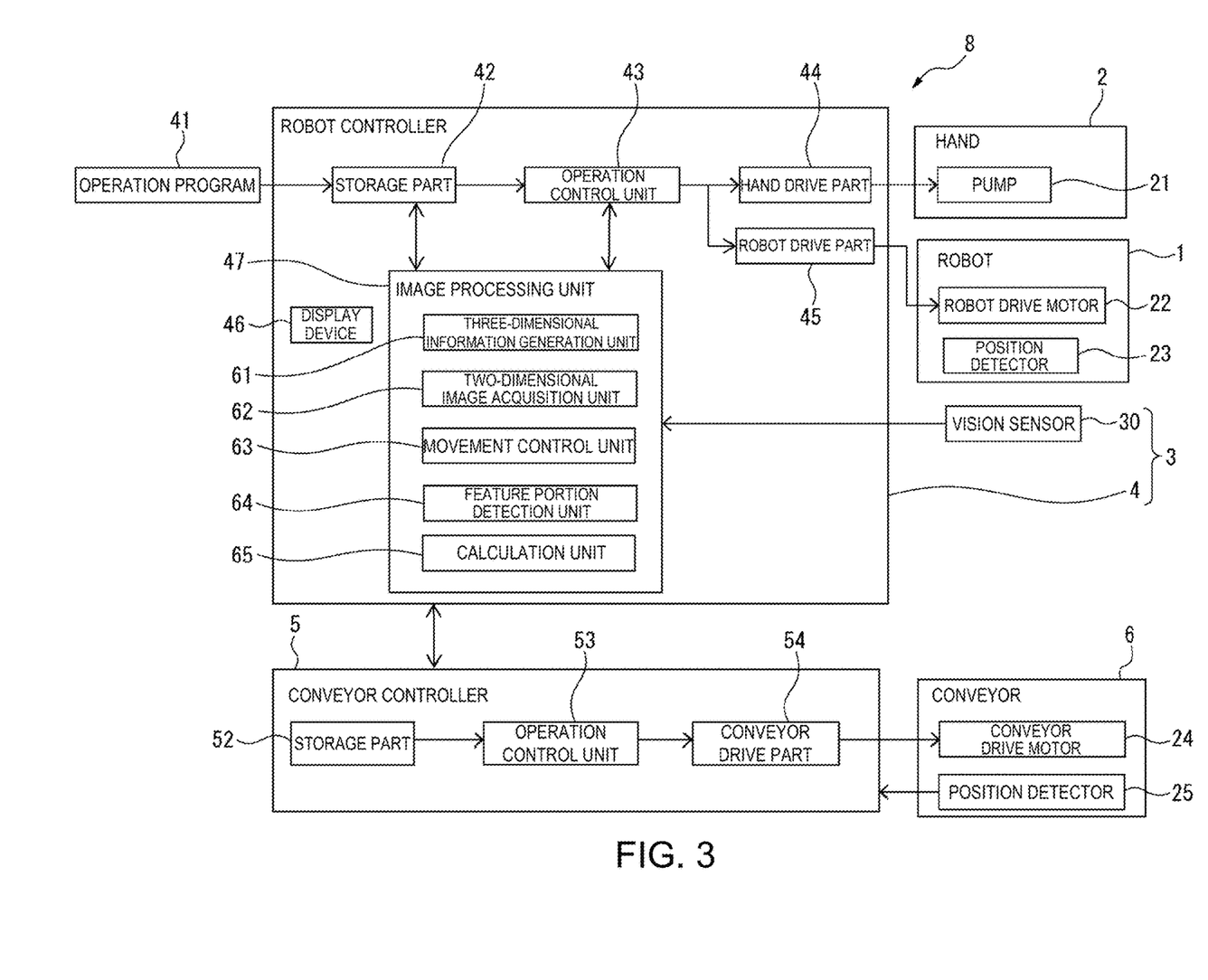
FIG. 3 is a block diagram of a first robot device.

FIG. 3 is a block diagram of the first robot device according to the present embodiment. Referring to FIGS. 1 to 3, the robot 1 includes a robot drive device for changing the position and the orientation of the robot 1. The robot drive device includes a robot drive motor 22 for driving a component such as an arm and a wrist. The hand 2 includes a hand drive device for driving the hand 2. The hand drive device includes a pump 21 and a solenoid valve, for depressurizing the interior of the absorption pad 2a of the hand 2.

The controller of the robot device 8 includes a robot controller 4 for controlling the robot 1 and the hand 2. The robot controller 4 includes an arithmetic processing device (computer) including a Central Processing Unit (CPU) as a processor. The arithmetic processing device includes a Random Access Memory (RAM) and a Read Only Memory (ROM), or the like, connected to the CPU via a bus. An operation program 41 created in advance in order to control the robot 1, the hand 2, and the conveyor 6 is input to the robot controller 4.

The robot controller 4 includes a storage part 42 that stores information about the control of the robot 1, the hand 2, and the conveyor 6. The storage part 42 may be configured of a storage storing information, such as a volatile memory, a nonvolatile memory, or a hard disk. The operation program 41 is stored in the storage part 42.

The robot device 8 according to the present embodiment conveys the workpiece 81 based on the operation program 41. The robot device 8 can automatically convey the workpiece 81 to a predetermined target position. The robot controller 4 includes an operation control unit 43 that transmits an operation command. The operation control unit 43 corresponds to a processor driven according to the operation program 41. The processor reads the operation program 41 and performs the control specified in the operation program 41, thereby functioning as the operation control unit 43.

The operation control unit 43 transmits an operation command for driving the robot 1 to the robot drive part 45 based on the operation program 41. The robot drive part 45 includes an electrical circuit for driving the robot drive motor 22. The robot drive part 45 supplies electricity to the robot drive motor 22 based on the operation command. Further, the operation control unit 43 transmits an operation command for driving the hand 2 to the hand drive part 44 based on the operation program 41. The hand drive part 44 includes an electrical circuit for driving a pump 21 and the solenoid valve. The hand drive part 44 supplies electricity to the pump 21 and the solenoid valve based on the operation command. Furthermore, the operation control unit 43 sends a command, to the vision sensor 30, for capturing an image based on the operation program 41.

The robot controller 4 includes a display device 46 for displaying information about the control of the hand 2, the robot 1, and the conveyor 6. The display device 46 is composed of an arbitrary display panel such as a liquid crystal display panel.

The robot 1 includes a state detector for detecting the position and the orientation of the robot 1. The state detector according to the present embodiment includes a position detector 23 mounted on a robot drive motor 22 corresponding to a drive axis of a component of the robot 1. The position detector 23 according to the present embodiment is constituted by an encoder attached to the output shaft of the robot drive motor 22. The position and the orientation of the robot 1 are detected based on the output of the position detector 23.

The robot controller 4 includes an image processing unit 47 as a processing unit for processing the output of the three-dimensional sensor and the output of the two-dimensional sensor. That is, the robot controller 4 also functions as a device processing an image. The image processing unit 47 includes a three-dimensional information generation unit 61 for generating three-dimensional information based on the output of the three-dimensional sensor. The image processing unit 47 includes a two-dimensional image acquisition unit 62 for acquiring the two-dimensional image from the two-dimensional sensor. Further, the image processing unit 47 includes a movement control unit 63 for changing the relative position of the three-dimensional information with respect to the two-dimensional image, in a predetermined coordinate system.

The image processing unit 47 includes a feature portion detection unit 64 for detecting a predetermined feature portion of the workpiece 81 based on a previously created reference image and a two-dimensional image acquired from the two-dimensional sensor. The image processing unit 47 includes a calculation unit 65 for calculating a position and an orientation of the workpiece 81 based on three-dimensional information in a feature portion of the workpiece 81. Further, the calculation unit 65 calculates the position and the orientation of the robot 1 based on the position and the orientation of the workpiece 81.

The position and the orientation of the robot 1 calculated in the calculation unit 65 are transmitted to the operation control unit 43. The operation control unit 43 controls the robot 1 and the hand 2 based on an operation command received from the calculation unit 65.

Each unit of the image processing unit 47, the three-dimensional information generation unit 61, the two-dimensional image acquisition unit 62, the movement control unit 63, the feature portion detection unit 64, and the calculation unit 65 corresponds to a processor driven according to the operation program 41. The processor performs the control defined in the operation program 41 so as to function as each unit.

The controller of the robot device 8 includes a conveyor controller 5 for controlling a conveyor 6. The conveyor controller 5 includes an arithmetic processing device (computer) that includes a CPU as a processor, a ROM, and a RAM. The conveyor controller 5 is configured to communicate with the robot controller 4. The conveyor controller 5 receives a command from the robot controller 4 and drives the conveyor 6.

The conveyor 6 includes a conveyor drive device 26 for driving the conveyor 6. The conveyor drive device 26 includes a conveyor drive motor 24 as a motor for driving the conveyor 6 and a reduction gear for reducing the rotation speed of the conveyor drive motor 24. The workpiece 81 is placed on the surface of a belt 6a as a movement member moved by the conveyor drive motor 24. The conveyor drive motor 24 rotates the belt 6a. The conveyor 6 includes a position detector 25 for detecting the position of the belt 6a. The position of the belt 6a corresponds to the rotational position of the output shaft of the conveyor drive motor 24. The position detector 25 according to the present embodiment is attached to the output shaft of the conveyor drive motor 24. The position detector 25 is composed of an encoder for detecting the rotational position of the output shaft. The output of the position detector 25 is input to the conveyor controller 5. Note that, the position detector of the carrier machine can be disposed at an arbitrary position so as to detect the position of the movement member of the carrier machine. For example, an encoder may be attached to a shaft supporting the belt of the conveyor. Alternatively, a disk may be attached to the encoder and pressed against the belt such that the disk rotates by the movement of the conveyor belt. With this configuration, when the belt moves, the disk rotates, and the position of the belt can be detected by the output of the encoder.

The conveyor controller 5 includes a storage part 52 that stores information about the control of the conveyor 6. The storage part 52 may be configured of a storage storing information, such as a volatile memory, a nonvolatile memory, or a hard disk. The conveyor controller 5 includes an operation control unit 53 that transmits an operation command for the conveyor 6. A processor of the arithmetic processing device functions as an operation control unit 53. The conveyor controller 5 includes a conveyor drive part 54 including an electrical circuit that supplies electricity to the conveyor drive motor 24 based on an operation command.

The controller of the robot device 8 according to the present embodiment includes the robot controller 4 for controlling the robot 1 and the hand 2 and the conveyor controller 5 for controlling the conveyor 6, but is not limited to this configuration. The robot device 8 may be configured to control the robot 1, the hand 2, and the conveyor 6 by one controller.

Figure 4:
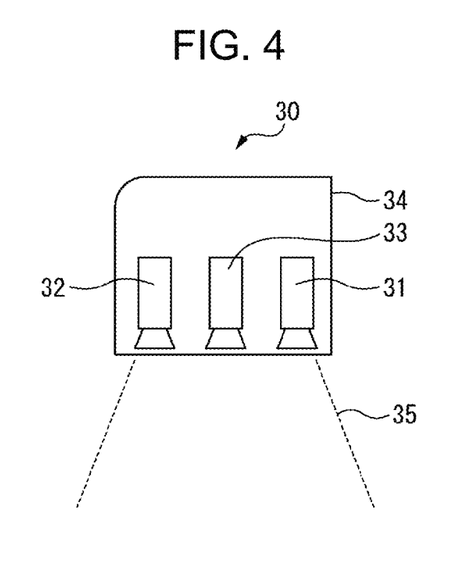
FIG. 4 is a schematic diagram of a vision sensor according to an embodiment.

FIG. 4 is a schematic view of the vision sensor according to the present embodiment. The vision sensor 30 according to the present embodiment is a stereo camera including a first camera 31 and a second camera 32. Each of the cameras 31 and 32 is a two-dimensional camera capable of capturing a two-dimensional image. The cameras 31 and 32 may each be any camera including an image sensor such as a Charge-Coupled Device (CCD) sensor or a Complementary Metal-Oxide Semiconductor (CMOS) sensor. The two cameras 31 and 32 are arranged apart from each other. The relative positions of the two cameras 31 and 32 are predetermined.

The vision sensor 30 according to the present embodiment includes a projector 33 that projects a pattern light such as a stripe pattern toward the workpiece 81. The cameras 31, 32 and the projector 33 are arranged inside the housing 34. When the three-dimensional information is acquired based on the output of the vision sensor 30, the projector 33 projects the pattern light, and cameras 31 and 32 capture the two-dimensional image.

Referring to FIG. 3, the three-dimensional information generation unit 61 of the image processing unit 47 can generate three-dimensional information of the surface of the object with a three-dimensional map by processing the image acquired by the vision sensor 30. The three-dimensional information includes information about the positions of a plurality of measurement points set on the surface of the object. The three-dimensional map represents the position of the surface of the object by a set of coordinate values (x, y, z) of measurement points set on the surface of the object.

Note that, the image processing unit 47 according to the present embodiment is included in the robot controller 4 for controlling the robot 1, but is not limited to this configuration. The arithmetic processing device for processing the image acquired by the vision sensor 30 may be disposed separately from the robot controller.

Referring to FIGS. 3 and 4, the three-dimensional information generation unit 61 according to the present embodiment sets a plurality of measurement points on the surface of an object disposed within the imaging range 35 of the vision sensor 30. For example, the measurement point can be set for each pixel of the two-dimensional image of the camera 31 or the camera 32. The three-dimensional information generation unit 61 calculates the distance from the vision sensor 30 to the measurement point based on the parallax of the two-dimensional images captured by the two cameras 31 and 32.

The three-dimensional information generation unit 61 can calculate the coordinate value of the measurement point in the sensor coordinate system 78 based on the distance from the vision sensor 30 to the measurement point. Alternatively, the coordinate values in the sensor coordinate system 78 may be converted to the coordinate values in the world coordinate system 76 based on the position and the orientation of the vision sensor 30. Thus, the three-dimensional information generation unit 61 can form a three-dimensional map including coordinate values of a plurality of measurement points.

The vision sensor 30 according to the present embodiment has a function as a two-dimensional sensor. Since the first camera 31 and the second camera 32 are two-dimensional cameras, a two-dimensional image can be captured by either of cameras 31 or 32. In the present embodiment, the two-dimensional image is acquired by the first camera 31.

The three-dimensional sensor according to the present embodiment is a stereo camera capable of capturing a two-dimensional image. By adopting this configuration, a two-dimensional image can be acquired by one two-dimensional camera included in the stereo camera. Both the position information of the three-dimensional measurement point and the two-dimensional image can be acquired by one sensor. Thus, the configuration of the imaging device can be simplified.

In the imaging device 3 according to the present embodiment, the vision sensor 30 acquires a three-dimensional map including the measurement point information of the surface of the workpiece 81. Thereafter, a two-dimensional image including the same workpiece 81 is captured by the first camera 31 of the vision sensor 30. The timing when performing imaging by the vision sensor 30 in order to acquire the three-dimensional map and the timing when capturing the two-dimensional image are different from each other. Thus, the position of the workpiece when the three-dimensional map is acquired and the position of the workpiece 81 when the two-dimensional image is captured are different from each other.

The movement control unit 63 according to the present embodiment obtains the output of the position detector 25 of the conveyor 6. The actual movement amount of the workpiece 81 moved from the time when the three-dimensional map is acquired to the time when the two-dimensional image is captured is calculated. Then, control is performed to move the three-dimensional information, so as to correspond to the movement amount of the workpiece 81, and so as to correspond to the two-dimensional image in a predetermined coordinate system. By this control, at least a part of the three-dimensional information of the workpiece, and the two-dimensional image of the workpiece, can be overlapped in the above coordinate system. In other words, the three-dimensional information and the two-dimensional image that are equivalent to the three-dimensional information and the two-dimensional image acquired at the same time, can be generated.

Figure 5:
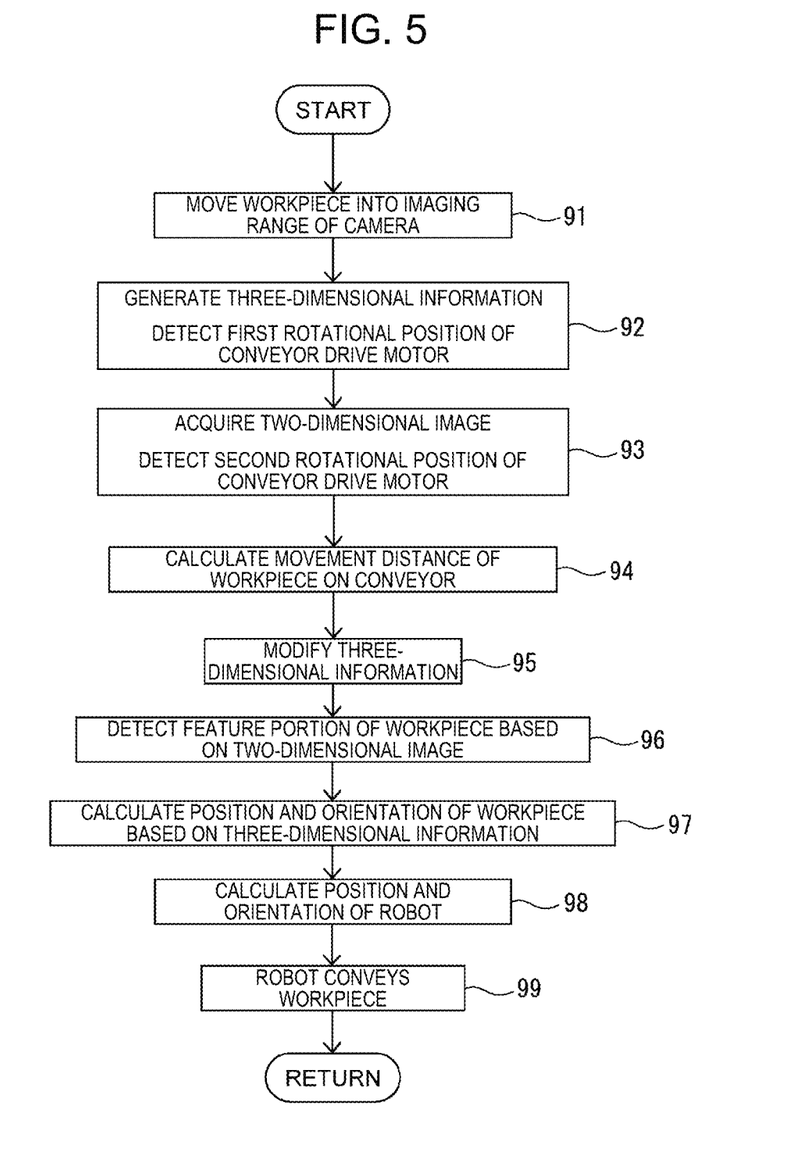
FIG. 5 is a flowchart of a control of a first robot device.
Figure 6:
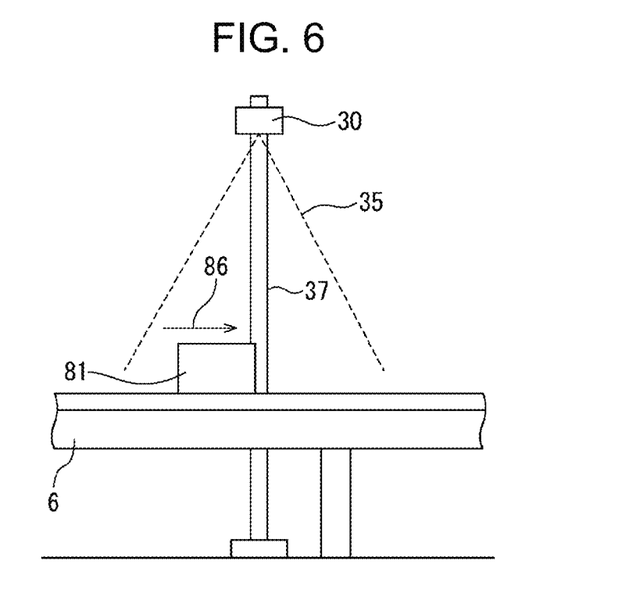
FIG. 6 is a front view of a workpiece, a vision sensor, and a conveyor when a three-dimensional map of the workpiece is generated.

FIG. 5 is a flowchart of the control of the robot device according to the present embodiment. FIG. 6 is a schematic front view of the vision sensor, the workpiece, and the conveyor when the three-dimensional map is acquired. Referring to FIGS. 5 and 6, in step 91, the conveyor controller 5 drives the conveyor 6 so as to move workpiece 81 as illustrated by an arrow 86. The conveyor controller 5 moves the workpiece 81 into the imaging range 35 of the vision sensor 30. In the robot device 8 according to the present embodiment, a sensor for detecting the arrival of the workpiece 81 is arranged. The position detector 25 detects the position at the time when the sensor reacts. The operation control unit 53 calculates the rotational position when the workpiece 81 is placed inside the imaging range 35 based on the above-described position. The position detector 25 detects the rotational position, which indicates that the workpiece 81 is located inside the imaging range 35.

In step 92, the vision sensor 30 images the workpiece 81. The three-dimensional information generation unit 61 generates three-dimensional information. In the present embodiment, the three-dimensional information generation unit 61 generates a three-dimensional map by using the two-dimensional images captured by the cameras 31 and 32. The conveyor controller 5 acquires the first rotational position from the position detector 25 attached to the conveyor drive motor 24. The conveyor controller 5 acquires the first rotational position simultaneously with imaging the workpiece 81 by the vision sensor 30. The first rotational position corresponds to a first position of the belt 6a when the three-dimensional information is acquired. The storage part 52 of the conveyor controller 5 stores the first rotational position.

Figure 7:
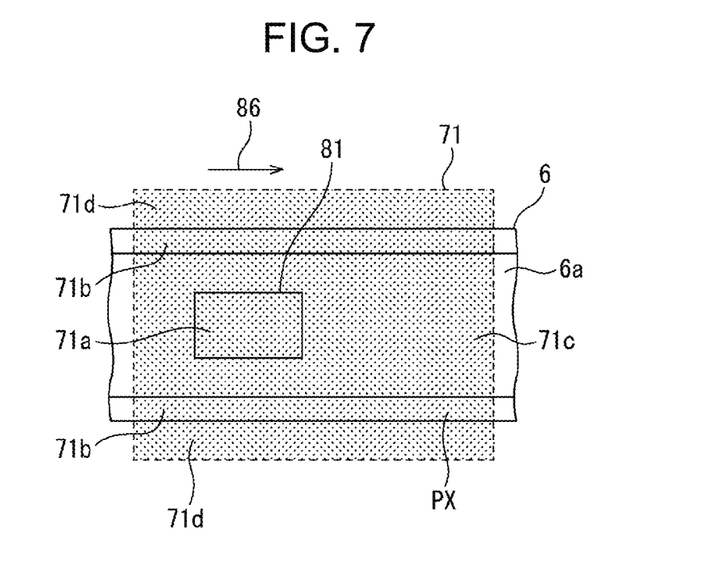
FIG. 7 is a plan view of a workpiece and a conveyor illustrating measurement points of a three-dimensional map acquired by the vision sensor.

FIG. 7 illustrates a three-dimensional map generated by the three-dimensional information generation unit. FIG. 7 illustrates a plan view of the conveyor 6 and the workpiece 81. The imaging range 35 of the vision sensor 30 determines the measurement region 71 in which the measurement points are set. The three-dimensional map includes the coordinate values of the positions of a plurality of measurement points PX. The measurement points PX are set on the surface of an object to be imaged inside the measurement region 71. The measurement region 71 corresponds, for example, to an image captured by the first camera 31. Inside the measurement region 71, the measurement points PX are set on the surface of the workpiece 81, the surface of the conveyor 6, and the floor surface. For each measurement point PX, a coordinate value of the position of the measurement point PX in a predetermined coordinate system is calculated. In the present embodiment, the coordinate value of the position of each measurement point PX is calculated in the sensor coordinate system 78.

In this example, a plurality of measurement points PX set on the surface of the workpiece 81 are referred to as a group 71a of the measurement points PX. A plurality of measurement points PX set on the surface of the frame body of the conveyor 6 is called a group 71b of the measurement points PX. A plurality of measurement points PX set on the surface of the belt 6a is called a group 71c of measurement points PX. Further, a plurality of measurement points PX set on the floor surface is called a group 71d of measurement points PX.

Figure 8:
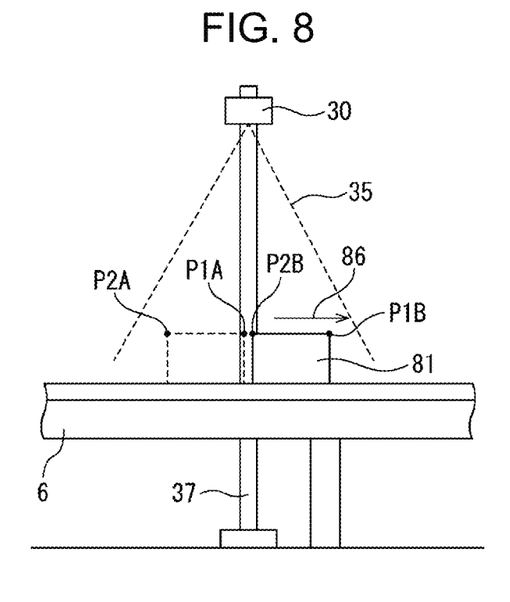
FIG. 8 is a front view of a workpiece, a vision sensor, and a conveyor when a two-dimensional image of the workpiece is acquired.

FIG. 8 illustrates a schematic front view of the vision sensor, the workpiece, and the conveyor when the two-dimensional image is captured. In FIG. 8, the position of the workpiece 81 when the three-dimensional map is acquired is indicated by a broken line. After the three-dimensional map is acquired, the workpiece 81 moves as indicated by the arrow 86. Referring to FIG. 5, in step 93, the first camera 31 of the vision sensor 30 captures a two-dimensional image. The first camera 31 captures an image of the workpiece 81 when the workpiece 81 is arranged in the imaging range 35. For example, the vision sensor 30 can capture a two-dimensional image immediately after performing imaging for acquiring a three-dimensional map. Alternatively, the vision sensor 30 can capture a two-dimensional image after a predetermined time elapses after performing imaging for acquiring a three-dimensional map.

Referring to FIG. 3, the two-dimensional image acquisition unit 62 acquires a two-dimensional image from the first camera 31 of the vision sensor 30. Note that, in place of the first camera 31, the two-dimensional image may be acquired by the second camera 32. Further, the conveyor controller 5 acquires the second rotational position from the position detector 25 of the conveyor drive motor 24. The conveyor controller 5 acquires the second rotational position simultaneously with capturing the two-dimensional image of the workpiece 81. The second rotational position corresponds to the second position of the belt 6a when the two-dimensional image is acquired. The storage part 52 stores the second rotational position.

Figure 9:
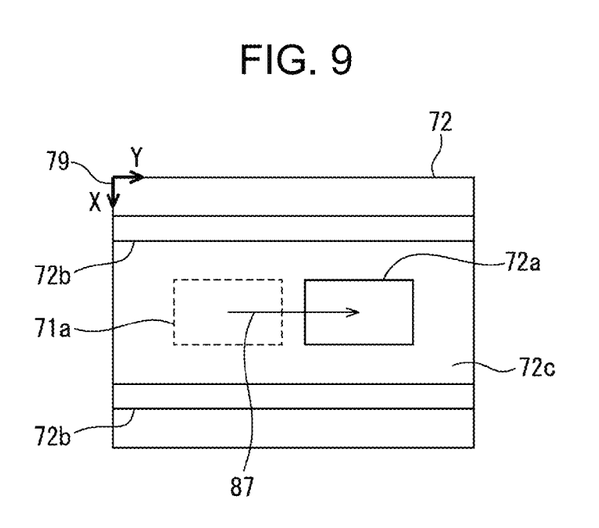
FIG. 9 is an example of a two-dimensional image acquired with a vision sensor.

FIG. 9 illustrates an example of a two-dimensional image captured by the first camera of the vision sensor. An image 72 is a two-dimensional image. An image coordinate system 79 is set in the image 72 according to the present embodiment. The image coordinate system 79 is a coordinate system whose origin is a predetermined point of the image 72. In this example, the image coordinate system 79 is composed of an X-axis and a Y-axis. The image 72 includes an image 72a corresponding to the top face of the workpiece 81.

The image 72 includes an image 72b corresponding to the frame of the conveyor 6 and an image 72c corresponding to the belt 6a. In FIG. 9, when the measurement region 71 is superimposed on the image 72, the measurement point group 71a corresponding to the top face of the workpiece 81 is illustrated by a broken line. In the present embodiment, the three-dimensional map and the two-dimensional image are acquired while moving the workpiece 81 on the conveyor 6. Thus, the position of the workpiece 81 when the two-dimensional image is captured is different from the position of the workpiece 81 when performing imaging for acquiring the three-dimensional map is performed.

The position of the image 72a of the workpiece 81 in the image 72 is shifted from the position of the group 71a of the measurement points on the top face of the workpiece 81. Thus, the movement control unit 63 of the image processing unit 47 performs control so as to move the positions of all measurement points of the three-dimensional map as indicated by an arrow 87. The positions of the measurement points are modified based on the direction in which the workpiece 81 has moved and the movement amount of the workpiece 81. The movement control unit 63 performs control for matching the position of the measurement point group 71a set on the top face of the workpiece 81 to the position of the image 72a.

Referring to FIGS. 3 and 5, in step 94, the movement control unit 63 calculates the movement distance of the workpiece 81 on the conveyor 6 as the movement amount of the workpiece 81. The movement distance of the workpiece 81 corresponds to the length of movement of the belt 6a. The movement control unit 63 acquires the first rotational position and the second rotational position of the conveyor drive motor 24 from the storage part 52 of the conveyor controller 5. The movement control unit 63 calculates the movement distance of the workpiece 81 based on the difference between the first rotational position and the second rotational position.

For example, the position detector 25 is configured to output a signal at each predetermined rotation angle. Thus, the signal output from the position detector 25 corresponds to the rotational position. The position detector 25 detects the first count CT1 as the first rotational position. The position detector 25 detects the second count CT2 as the second rotational position. The movement amount of the belt 6a (movement amount of the workpiece) relative to the difference of counts is predetermined. Here, the coefficient SC [count/mm] of the count number with respect to the movement amount of 1 mm of the belt 6a is predetermined. The movement distance X of the workpiece 81 at this time can be expressed by the following equation (1).

$$X[\text{mm}] = (CT2 - CT1)/SC \quad (1)$$

Thus, the movement control unit 63 calculates the movement distance of the workpiece 81 on the conveyor 6 based on the output of the position detector 25.

Referring to FIG. 5, in step 95, the movement control unit 63 modifies the three-dimensional map according to the moving direction of the workpiece 81 and the movement amount of the workpiece 81. The movement control unit 63 moves the positions of the measurement points included in the three-dimensional map in the moving direction of the workpiece 81. The moving direction of the workpiece 81 in the sensor coordinate system 78 is predetermined. In this example, the workpiece 81 moves in the direction of the X-axis of the sensor coordinate system 78.

In the three-dimensional map of the present embodiment, the positions of the measurement points in the measurement region 71 are detected by the coordinate values in the sensor coordinate system 78. The movement control unit 63 moves the positions of the measurement points included in the three-dimensional map by the movement amount of the workpiece 81. Further, the movement control unit 63 parallel-translates the position of the measurement point included in the three-dimensional map in the moving direction of the workpiece 81.

Referring to FIG. 8, the movement control unit 63 moves the position for each measurement point. For example, the three-dimensional map includes the coordinate values of the measurement point P1A located on the surface of the workpiece 81. The movement control unit 63 moves the measurement point P1A by the movement amount of the workpiece 81 in the direction in which the workpiece 81 moves. The measurement point P1A moves to the measurement point P1B. In this example, the X-axis coordinate value of the measurement point P1A in the sensor coordinate system 78 is modified by the movement amount of the workpiece 81. Further, the three-dimensional information includes the coordinate values of the measurement point P2A set on the surface of the workpiece 81. The movement control unit 63 moves the measurement point P2A to the measurement point P2B in a similar manner. The X-axis coordinate value of the measurement point P2A in the sensor coordinate system 78 is modified by the movement amount of the workpiece 81. Thus, the coordinate values of the measurement point can be changed so as to correspond to the movement of the workpiece 81. Here, all measurement points in the measurement region 71 are moved.

Referring to FIG. 9, when the measurement region 71 is superimposed on the image 72, the moving direction of the measurement point groups 71a to 71d in the image 72 is preset. In this example, the movement control unit 63 moves the measurement point groups 71a to 71d in the Y-axis positive direction in the image coordinate system 79. The position of the vision sensor 30 is fixed. The ratio of the movement distance of the measurement point in the image coordinate system 79 to the actual movement distance of the workpiece 81 is preset. The movement control unit 63 calculates the movement distance of the measurement point groups 71a to 71d in the image coordinate system 79 based on the movement distance of the workpiece 81. The movement control unit 63 moves the three-dimensional map as indicated by the arrow 87. At least a part of the measurement points of the group 71a moves into the region of the image 72a that is a two-dimensional image of the workpiece 81. As a result, at least some measurement points of the group 71a are included in the region of the image 72a.

Referring to FIGS. 3 and 5, in step 96, the feature portion detection unit 64 of the image processing unit 47 detects the feature portion of the workpiece 81 in the image 72 which is a two-dimensional image. In the present embodiment, the top face of the workpiece 81 is set as a feature portion. The reference image of the top face of the workpiece 81 is previously stored in the storage part 42. The reference image is a two-dimensional image. The reference image may be an image obtained by actually capturing an image of the top face of the workpiece 81 with the two-dimensional camera.

Alternatively, the reference image of the workpiece 81 may be generated based on the three-dimensional data of the workpiece 81 using a Computer Aided Design (CAD) apparatus. The feature portion detection unit 64 detects the image 72*a* on the top face of the workpiece 81 in the image 72 by a template matching method by using the reference image.

Next, in step 97, the calculation unit 65 calculates the position and the orientation of the workpiece 81. As the position of the workpiece 81, for example, the position of the center of gravity of the rectangle on the top face of the workpiece 81 can be adopted. Further, as the orientation of the workpiece, the normal direction of the top face of the workpiece 81 can be adopted. The calculation unit 65 extracts the measurement points arranged in a region overlapping the image 72*a*. In this example, in order to overlap the measurement point group 71*a* with the image 72*a*, the calculation unit 65 extracts a plurality of measurement points included in the group 71*a*. The calculation unit 65 can calculate the position and the orientation of the workpiece 81 based on the coordinate values of the plurality of measurement points.

As described above, in the present embodiment, the feature portion of the workpiece 81 can be detected in the two-dimensional image, and the position and the orientation of the workpiece 81 can be detected based on the three-dimensional information in the feature portion of the workpiece 81.

Next, in step 98, calculation unit 65 calculates the position and the orientation of the robot 1 based on the position and the orientation of the workpiece 81. A calculation unit 65 calculates a position and an orientation of the workpiece 81 when the workpiece 81 is moved by a conveyor 6 to a position in which the workpiece 81 is held by the hand 2. The calculation unit 65 calculates the position and the orientation of the robot 1 based on the position and the orientation of the workpiece 81 at that time.

In step 99, the calculation unit 65 transmits commands, to the operation control unit 43, for driving the robot 1 and the hand 2. The operation control unit 43 drives the robot 1 and the hand 2 based on the commands from the calculation unit 65. The workpiece 81 is held by the hand 2 and conveyed to a target position.

As described above, the imaging device 3 according to the present embodiment can synchronize the three-dimensional information with the two-dimensional image. That is, the three-dimensional information can be modified as though the three-dimensional information has been acquired at the same time as the two-dimensional image. Thus, imaging the workpiece 81 and grasping the workpiece 81 by the hand 2 can be performed while moving the workpiece 81 by the conveyor 6. In the robot device 8 according to the present embodiment, it is not necessary to stop the conveyor 6 for acquiring the three-dimensional information and the two-dimensional image, and the working time can be shortened. Alternatively, it is possible to prevent the position of the workpiece from shifting on the conveyor 6 when the conveyor 6 stops or starts.

The imaging device 3 described above captures a two-dimensional image after acquiring three-dimensional information, but is not limited to this configuration. The imaging device may acquire three-dimensional information after capturing a two-dimensional image. In this case as well, the movement control unit can perform control for moving the position of the measurement point in the three-dimensional information so as to match the position of the two-dimensional image.

The carrier machine of the first robot device 8 is a conveyor 6, but is not limited to this configuration. As the carrier machine, any device for conveying the workpiece 81 in a predetermined direction can be adopted.

Figure 10:
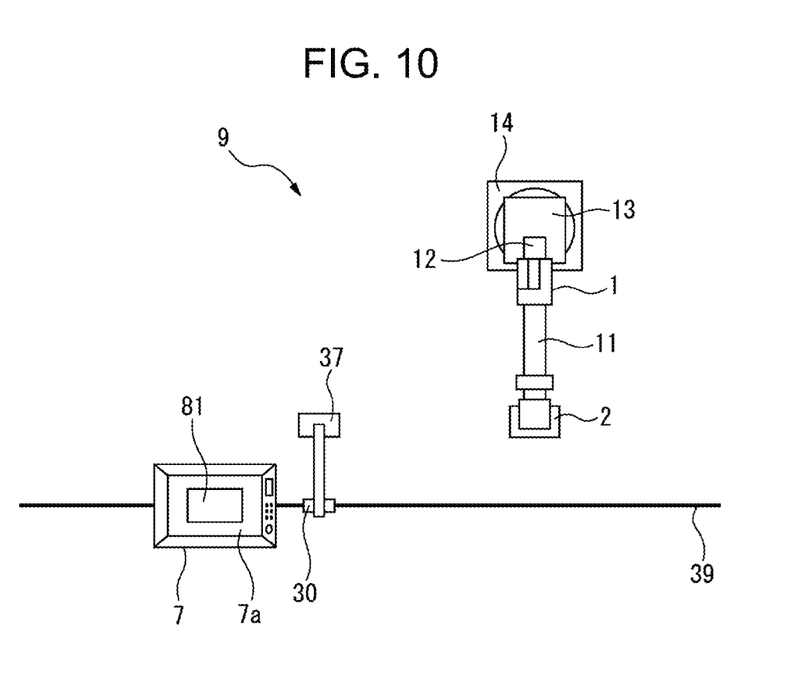
FIG. 10 is a plan view of a second robot device according to an embodiment.

FIG. 10 is a schematic plan view of a second robot device according to the present embodiment. In the second robot device 9, instead of the conveyor 6 of the first robot device 8, a carrier 7 as a carrier machine is arranged. The carrier 7 according to the present embodiment is an unmanned traveling carriage that automatically moves along the tape 39. A carrier controller is arranged in place of the conveyor controller 5 of the first robot device 8. The carrier controller controls the carrier 7 by radio communication, for example.

The carrier 7 conveys the workpiece 81. The carrier 7 includes a mounting table 7*a* on which the workpiece 81 is placed. The carrier 7 includes a sensor for detecting the tape 39 attached to a floor surface. The carrier 7 is configured to move along the tape 39 while detecting the tape 39 with the sensor. That is, the moving direction of the carrier 7 is predetermined. The carrier 7 moves the workpiece 81 horizontally. A vision sensor 30 fixed to a support member 37 is arranged above a path where the carrier 7 moves. The vision sensor 30 is arranged at a position where the workpiece 81 conveyed by the carrier 7 can be imaged.

The carrier 7 includes a drive motor for driving wheels. A position detector is attached to the output shaft of the drive motor. The mounting table 7*a* corresponds to a movement member moved by a driving motor. The position of the mounting table 7*a* may be determined, for example, by a position of a set point set at an arbitrary position of the carrier 7. Further, the position of the mounting table 7*a* corresponds to the rotational position of the output shaft of the drive motor. Note that, the position detector may be attached to the shaft of the carrier's wheel.

In the second robot device 9, the vision sensor 30 performs imaging while the carrier 7 is moving. The image processing unit 47 acquires the three-dimensional map and the two-dimensional image at different time points. Further, the image processing unit 47 acquires a first rotational position detected by the position detector when the three-dimensional map is acquired and a second rotational position detected by the position detector when the two-dimensional image is acquired.

The movement control unit 63 of the image processing unit 47 calculates the movement distance of the workpiece 81 based on the first rotational position and the second rotational position. The movement control unit 63 modifies the positions of the measurement points of the three-dimensional map based on the movement amount of the workpiece 81. A movement control unit 63 changes the relative position of the three-dimensional information of the workpiece with respect to the two-dimensional image of the workpiece in the image coordinate system. A movement control unit 63 performs control for moving the three-dimensional information of the workpiece into the region of the two-dimensional image of the workpiece. The image processing unit 47 can then detect the position and the orientation of the workpiece 81 based on the three-dimensional map and the two-dimensional image.

The configuration, operation, and effect of the other second robot devices are similar to those of the first robot device, and the description thereof will not be repeated here.

In the above embodiment, the reference image is used in order to detect the feature portion of the workpiece, but the embodiment is not limited to this. The reference image needs not to be used when the robot grasps the workpiece. For example, three-dimensional information such as a three-dimensional map is moved according to the movement amount of the workpiece. The position of the center of gravity of the workpiece is detected based on the three-dimensional information. The position and the orientation of the hand with respect to the position of the center of gravity are predetermined. The position and the orientation of the hand can be calculated based on the position of the center of gravity of the workpiece.

The carrier machine according to the present embodiment conveys the workpiece along a straight path, but is not limited to this configuration. When the direction in which the workpiece is moved is determined, the carrier machine may move the workpiece along a curved path.

The imaging device according to the present embodiment acquires three-dimensional information and two-dimensional images in order to detect the position and the orientation of the workpiece, but is not limited to this configuration. The imaging device can acquire three-dimensional information and two-dimensional images for arbitrary control. Further, the imaging device can synchronize the two-dimensional image with the three-dimensional information by moving the three-dimensional information in a predetermined coordinate system.

In each of the above-described controls, the order of steps can be changed appropriately to the extent that the function and the effect are not changed.

The above-described embodiments can be suitably combined. In each of the above drawings, the same or equivalent parts are denoted by the same reference numerals. It should be noted that the above-described embodiments are examples and does not limit the invention. Further, the embodiments include modifications of the embodiments illustrated in the claims.

REFERENCE SIGNS LIST

1 Robot
2 Hand
3 Imaging device
4 Robot controller
5 Conveyor controller
6 Conveyor
7 Carrier
8, 9 Robot device
24 Conveyor drive motor
25 Position detector
26 Conveyor drive device
30 Vision sensor
31 First camera
32 Second camera
47 Image processing unit
61 Three-dimensional information generation unit
62 Two-dimensional image acquisition unit
63 Movement control unit
64 Feature portion detection unit
65 Calculation unit
71 Measurement region
71a, 71b, 71c, 71d Group
72 Image
72a, 72b Image
78 Sensor coordinate system
79 Image coordinate system
81 Workpiece
P1A, P1B, P2A, P2B Measurement point

The invention claimed is:

1. An imaging device for imaging a workpiece moved in a predetermined direction by a carrier machine driven by a motor, the imaging device comprising:
    a vision sensor including:
        a three-dimensional sensor configured to detect three-dimensional information of a surface of the workpiece, and
        a two-dimensional sensor configured to acquire a two-dimensional image of the surface of the workpiece; and
    a processor configured to;
        process an output of the three-dimensional sensor and an output of the two-dimensional sensor,
        generate three-dimensional information based on the output of the three-dimensional sensor,
        acquire a two-dimensional image from the two-dimensional sensor, and
        change a relative position of the three-dimensional information with respect to the two-dimensional image in a sensor coordinate system whose origin is fixed to the vision sensor,
    wherein
    the carrier machine includes a position detector configured to detect a position of a movement member moved by the motor,
    the vision sensor is configured to image the workpiece to obtain the three-dimensional information and the two-dimensional image while the carrier machine moves the workpiece during a period in which the workpiece is inside an imaging range of the vision sensor,
    a timing for acquiring the three-dimensional information differs from a timing for acquiring the two-dimensional image,
    a moving direction of the three-dimensional information in the sensor coordinate system is predetermined to correspond to a movement path of the workpiece,
    the processor is further configured to:
        calculate a movement amount of the workpiece corresponding to a difference between a first position of the movement member when the three-dimensional information is acquired and a second position of the movement member when the two-dimensional image is acquired,
        move a plurality of measurement points included in the three-dimensional information in a direction parallel to the moving direction in the sensor coordinate system in a manner to correspond to the movement amount of the workpiece, and
        move the plurality of measurement points into a region of the two-dimensional image of the workpiece,
    an image coordinate system whose origin is set at a predetermined point of the two-dimensional image is predetermined,
    a ratio of a movement distance of the plurality of measurement points in the image coordinate system to an actual movement distance of the workpiece is preset, and
    the processor is configured to move the plurality of measurement points into the region of the two-dimensional image of the workpiece based on the ratio.

2. The imaging device according to claim 1, wherein the three-dimensional sensor is configured to capture a two-dimensional image.

3. The imaging device according to claim 1, wherein
the carrier machine is a conveyor configured to move the workpiece, and
the motor is a conveyor drive motor configured to drive the conveyor.

\* \* \* \* \*